US007476342B2

(12) United States Patent
Endo et al.

(10) Patent No.: US 7,476,342 B2
(45) Date of Patent: Jan. 13, 2009

(54) RESISTOR COMPOSITION AND THICK FILM RESISTOR

(75) Inventors: Tadashi Endo, Tokyo (JP); Hiroshi Mashima, Tokyo (JP); Tadashi Kanasaku, Ome (JP); Tetsuya Tanaka, Hamura (JP); Mikio Yamazoe, Nishitokyo (JP)

(73) Assignee: Shoei Chemical Inc., Shinjuku-ku, Tokyo (JP)

( * ) Notice: Subject to any disclaimer, the term of this patent is extended or adjusted under 35 U.S.C. 154(b) by 106 days.

(21) Appl. No.: 11/527,176

(22) Filed: Sep. 26, 2006

(65) Prior Publication Data

US 2007/0075301 A1    Apr. 5, 2007

(30) Foreign Application Priority Data

Oct. 3, 2005   (JP) .............................. 2005-290216

(51) Int. Cl.
*H01B 1/16* (2006.01)
*H01B 1/22* (2006.01)
(52) U.S. Cl. ................................. 252/518.1; 338/22 R
(58) Field of Classification Search ............ 252/518.1, 252/519.13; 338/22 R
See application file for complete search history.

(56) References Cited

U.S. PATENT DOCUMENTS 4,536,328 A * 8/1985 Hankey ................. 252/519.12

5,491,118 A * 2/1996 Hormadaly ................... 501/20
5,534,194 A * 7/1996 Borland et al. ......... 252/519.13

FOREIGN PATENT DOCUMENTS

| GB | 2 107 302 A | 4/1983 |
| JP | 03101101 A | 4/1991 |
| JP | 8-253342 | 10/1996 |
| JP | 09120712 A | 5/1997 |
| JP | 2003257703 A | 9/2003 |
| JP | 2005116337 | * 4/2005 |
| JP | 2005-129806 | 5/2005 |

OTHER PUBLICATIONS

European Search Report, dated Aug. 23, 2007 (7 sheets).

* cited by examiner

*Primary Examiner*—Mark Kopec
(74) *Attorney, Agent, or Firm*—Flynn, Thiel, Boutell & Tanis, P.C.

(57) ABSTRACT

A resistor composition containing: a lead-free ruthenium-based electrically conductive component, a lead-free glass having a glass basicity (Po value) of 0.4 to 0.9, and an organic vehicle; wherein, $MSi_2Al_2O_8$ crystals (M: Ba and/or Sr) are present in a thick film resistor obtained by firing this composition. The ruthenium-based resistor composition is capable of forming a lead-free thick film resistor which eliminates harmful lead components from an electrically conductive component and glass, and has superior TCR characteristics, current noise characteristics, withstand voltage characteristics and stability after a heat cycling test over a wide resistance range.

10 Claims, No Drawings

RESISTOR COMPOSITION AND THICK FILM RESISTOR

BACKGROUND OF THE INVENTION

1. Field of the Invention

The present invention relates to a resistor composition, and more particularly, to a lead-free, ruthenium-based thick film resistor composition used to form a thick film resistor in, for example, various types of resistor components such as chip resistors, semi-fixed resistors, variable resistors, focus resistors, and surge devices, as well as in thick film circuits, multilayer circuit substrates and various types of laminated composite components.

2. Description of the Related Art

Thick film resistor compositions are mainly composed of an electrically conductive component and glass, and are used to form thick film resistors on various insulating substrates. Resistor compositions are printed in a predetermined shape on an alumina substrate, ceramic composite component or the like, having electrodes thereon, in the form of a paste or coating material, and are fired at a high temperature of about 600 to 900° C. After subsequently forming a protective coating with an overcoat glass as necessary, the resistance value is adjusted by laser trimming and so on as necessary.

Examples of characteristics required of resistors include a small temperature coefficient of resistance (TCR), low current noise, satisfactory withstand voltage characteristics, ESD characteristics and long life characteristics, and satisfactory process stability, or in other words, small changes in resistance values caused by process fluctuations. In addition, in the case of chip resistors in particular, adjustment of the resistance value by laser trimming is required to be able to be carried out easily, and deterioration of characteristics after trimming is required to be small.

Resistor compositions have widely been used in the prior art which use a ruthenium-based oxide powder for the electrically conductive component. These ruthenium-based resistor compositions can be fired in air, and by changing the ratio of electrically conductive component and glass, resistors can be easily obtained having a wide range of resistance values from 1 Ω/□ or less to several MΩ/□, while also demonstrating satisfactory electrical characteristics and superior stability.

Examples of substances used as electrically conductive components of ruthenium-based resistor compositions mainly include ruthenium dioxide, ruthenium composite oxides of pyrochlore structure such as bismuth ruthenate, lead ruthenate, etc., ruthenium composite oxides of perovskite structure such as barium ruthenate, calcium ruthenate, etc., and ruthenium precursors such as ruthenium resinates. In particular, ruthenium composite oxides are preferably used in high-resistance resistor compositions having a high glass content. This is because, since ruthenium composite oxides normally have a higher resistivity than ruthenium dioxide by a factor of 10 or more, they can be blended in larger amounts than ruthenium dioxides, thereby reducing variations in resistance values, and allowing the obtaining of stable resistors having satisfactory current noise characteristics, TCR and other resistor characteristics.

In addition, glass —containing lead oxide was primarily used for the glass. This is because lead oxide-containing glass has superior characteristics suitable for the formation of thick film resistors, including a low softening point, satisfactory fluidity and good wetability to an electrically conductive component, superior adhesion to substrates, and a coefficient of thermal expansion that is compatible with ceramics, and particularly alumina substrates.

However, lead components are toxic and are undesirable from the perspective of their effects on the human body and pollution. Amidst the requirements placed on electronics products to comply with WEEE (Waste Electrical and Electronic Equipment) and RoHS (Restriction of the Use of Certain Hazardous Substances) requirements in order to deal with environmental issues in recent years, there is a strong need to develop lead-free materials for resistor compositions as well.

Several resistor compositions have been proposed in the past which use lead-free ruthenium dioxide, bismuth ruthenate, alkaline earth metal ruthenates or the like as electrically conductive components and lead-free glass (see Patent Documents 1 and 2, listed below).

However, resistor compositions have not yet been obtained which do not use lead glass but are still comparable to conventional lead glass-containing ruthenium-based resistor compositions, demonstrating superior characteristics over a wide range of resistance values. It has been particularly difficult to form high-resistance resistors having a resistance of 100 kΩ/□ or more.

In general, many of the ruthenium composite oxides used in high resistance ranges tend to decompose to ruthenium dioxide having a lower resistivity than ruthenium composite oxides as a result of reacting with glass during firing of the resistor composition at high temperatures. In the case of combining with lead-free glass in particular, it is difficult to inhibit the decomposition to ruthenium dioxide during firing in the vicinity of 800 to 900° C. Consequently, the resistance values decreased and thereby prevented the obtaining of a desired high resistance value, while also resulting in the problems of an increased film thickness dependency and firing temperature dependency. The decomposition can be inhibited to a certain degree by using a ruthenium composite oxide powder having a large particle size such as a mean particle size of 1 μm or more as in Patent Document 1. However, the use of a coarse electrically conductive powder worsens current noise and load —life characteristics, thereby preventing the obtaining of superior resistor characteristics.

In addition, in the case of combining with lead-free glass, ruthenium composite oxides are typically considered to have a difficulty in producing fired films having a satisfactory microstructure. For example, although bismuth glass like that described in Patent Document 2 is known to be effective for preventing decomposition of bismuth ruthenate, this resistor composition has a large negative TCR in the high resistance range and cannot be used in such applications.

Observation of the microstructure of a resistor fired film with an electron microscope normally reveals extremely fine conductive particles dispersed throughout the glass matrix, with the conductive particles contacting each other to form a network (network structure). This is thought to result in the formation of conductive pathways, thereby demonstrating electrical conductivity. In the case of resistor compositions using conventional ruthenium composite oxides and lead-free glass, it is extremely difficult to form a stable network structure (to be referred to as a "conductive network") in the high resistance range, especially where the ratio of the electrically conductive component is low. Consequently, it has been difficult to produce lead-free resistors demonstrating high resistance values and having superior TCR characteristics and current noise characteristics as well as minimized fluctuation of the characteristics.

[Patent Document 1] Japanese Patent Publication No. 2005-129806A

[Patent Document 2] Japanese Patent Publication No. 8-253342A

SUMMARY OF THE INVENTION

An object of the present invention is to provide a ruthenium-based resistor composition capable of forming a thick film resistor which eliminates harmful lead components from an electrically conductive component and glass, and has superior characteristics equal to or better than the prior art in terms of adhesive strength, resistance values, TCR characteristics, current noise characteristics, withstand voltage characteristics, stability after a heat cycling test, etc., over a wide resistance range. In addition, another object of the present invention is to provide a ruthenium-based resistor composition capable of forming a thick film resistor which prevents decomposition of a ruthenium composite oxide during firing, reduces fluctuations and variations in resistance values, TCR and so on caused by firing conditions, and therefore demonstrates stable characteristics even in the high resistance range.

In order to achieve the above-mentioned objects, the present invention is composed as described below.

(1) A resistor composition comprising: a lead-free ruthenium-based electrically conductive component, a lead-free glass having a glass basicity (Po value) of 0.4 to 0.9, and an organic vehicle; wherein, $MSi_2Al_2O_8$ crystals (M: Ba and/or Sr) are present in a thick film resistor obtained by firing the composition.

(2) The resistor composition according to (1) above, wherein the glass contains, as essential components, at least barium and/or strontium, aluminum and silicon, and precipitates $MSi_2Al_2O_8$ crystals (M: Ba and/or Sr) by firing.

(3) The resistor composition according to (1) or (2) above, wherein the Young's modulus of the glass is within a range of 50 to 95 GPa.

(4) The resistor composition according to any of (1) to (3) above, wherein the ruthenium-based electrically conductive component is a ruthenium composite oxide.

(5) The resistor composition according to any of (1) to (4) above, wherein the ruthenium-based electrically conductive component and the glass are contained in the form of ruthenium-based electrically conductive powder and glass powder, respectively.

(6) The resistor composition according to any of (1) to (4) above, wherein at least a portion of the ruthenium-based electrically conductive component and the glass are contained in the form of a preliminarily compounded composite powder.

(7) The resistor composition according to (5) or (6) above, wherein the ruthenium-based electrically conductive powder or the preliminarily compounded composite powder has a specific-surface area of 5 to 30 $m^2/g$.

(8) A thick film resistor comprising: a lead-free ruthenium-based electrically conductive phase and $MSi_2Al_2O_8$ crystals (M: Ba and/or Sr) present in a lead-free glass matrix.

According to the present invention, a resistor having characteristics comparable or superior to a lead-containing ruthenium resistor of the prior art can be formed over a broad range of resistance values despite having a lead-free composition. In the case of using a ruthenium composite oxide for the electrically conductive component in particular, the decomposition of the ruthenium composite oxide during firing is thought to be inhibited, thereby facilitating the formation of a uniform and stable conductive network within a glass matrix. Consequently, a superior thick film resistor can be produced which is free of deterioration of characteristics even at high resistance levels, has little process dependency such as on firing conditions, and demonstrates little fluctuation. In addition, since decomposition can be minimized even in the case of using an extremely fine ruthenium composite oxide powder, a resistor can be obtained having extremely superior current noise characteristics and load life characteristics.

The resistor composition of the present invention is extremely useful for producing a resistor of the medium to high resistance range of 1 k$\Omega$/□ or more, and particularly a resistor of the high resistance range of 100 k$\Omega$/□ or more.

In particular, laser trimming and firing temperature dependency can be further improved by using glass having a Young's modulus of 50 to 95 GPa.

A resistor can be formed having even more superior current noise characteristics and load life characteristics by using a ruthenium-based electrically conductive powder having a specific surface area of 5 to 30 $m^2/g$ for the ruthenium-based electrically conductive component.

In addition, a resistor can be obtained having even more satisfactory characteristics in the high resistance range by using a resistor composition containing a composite powder in which the ruthenium-based electrically conductive component and all or a portion of the glass have been compounded in advance. In addition, the current noise characteristics and load life characteristics of the resulting resistor can be further improved in the case the specific surface area of this composite powder is 5 to 30 $m^2/g$.

DETAILED DESCRIPTION OF THE PREFERRED EMBODIMENTS

Electrically Conductive Component

A lead-free ruthenium-containing electrically conductive oxide is mainly used for the ruthenium-based electrically conductive component, examples of which include ruthenium dioxide ($RuO_2$); ruthenium composite oxides having a pyrochlore structure such as neodymium ruthenate ($Nd_2Ru_2O_7$), samarium ruthenate ($Sm_2Ru_2O_7$), neodymium calcium ruthenate ($NdCaRu_2O_7$), samarium strontium ruthenate ($SmSrRu_2O_7$) and related oxides thereof; ruthenium composite oxides having a perovskite structure such as calcium ruthenate ($CaRuO_3$), strontium ruthenate ($SrRuO_3$), barium ruthenate ($BaRUO_3$), etc.; other ruthenium composite oxides such as cobalt ruthenate ($Co_2RuO_4$), strontium ruthenate ($Sr_2RuO_4$), etc.; and, mixtures thereof.

In particular, the present invention demonstrates superior effects as previously described in the case of using a ruthenium composite oxide alone or in combination with ruthenium dioxide for the electrically conductive component in order to product a resistor from the medium resistance range to the high resistance range. However, satisfactory resistor characteristics can naturally also be obtained even in the case of using ruthenium dioxide alone.

In a preferable aspect of the present invention, these electrically conductive components are contained as a fine powder of the ruthenium-based electrically conductive oxide. In another preferable aspect of the present invention, a composite powder is used which is obtained by preliminarily heat treating and compounding the ruthenium-based electrically conductive oxide with a glass powder followed by finely crushing. The use of such a composite powder is thought to more easily facilitate the formation of a stable conductive network, which was difficult to produce with conventional lead-free resistors, thereby allowing the obtaining of a resistor having little fluctuations and satisfactory electrical characteristics and process stability.

Although there are no particular limitations on the particle size of the electrically conductive oxide powder or the composite powder, these powders having a specific surface area of 5 to 30 m$^2$/g determined by the BET method, which is converted to a mean particle size of 0.02 to 0.2 μm, are preferably used, while their mean particle size is more preferably from 0.04 to 0.1 μm. As a result of using this type of extremely fine powder, the electrically conductive particles are satisfactorily dispersed in the fired resistor film, a uniform and stable electrically conductive particle/glass fine structure is formed, and a resistor is obtained having extremely superior current noise characteristics and load life characteristics. The present invention is insusceptible to decomposition of the composite oxide due to firing even in the case of using this type of fine ruthenium composite oxide having a large specific surface area. If the specific surface area is less than 5 m$^2$/g, current noise and load life characteristics tend to worsen. In addition, if the specific surface area exceeds 30 m$^2$/g, since the reactivity with the glass increases, it becomes difficult to obtain stable characteristics. A specific surface area within the range of 10 to 25 m$^2$/g is particularly preferable.

Furthermore, other electrically conductive components may be used in combination with these ruthenium-based electrically conductive components as desired, examples of which include powders of silver, silver oxide, gold, palladium, palladium oxide, platinum and copper, as well as compounds which are precursors thereof.

Glass

The glass is required to have a basicity value in the Specified range and a composition such that it does not contain a lead component and $MSi_2Al_2O_8$ crystals (M: Ba and/or Sr) are present in the resistor film obtained by firing the resistor composition. The glass basicity value Po was calculated in accordance with the definition of glass basicity B, which is a parameter that represents the amount of activity (donating ability) of the oxygen ions of the glass, as proposed in Kenji Morinaga et al., J. Am. Ceram. Soc., 77 (12), 3113-3118 (1994). More specifically, the glass basicity value Po described in this specification was determined by using the following calculation from the oxide components which compose the glass, and the larger the value thereof, the stronger the basicity of the glass.

Po=Σ(n$_i$×Po') (where, Po' is the basicity of each oxide that composes the glass, and n$_i$ is the molar fraction of cations in the glass). The basicity (Po') of each oxide is represented by the following equation based on the value of Po' for CaO being 1, and the value of Po' for SiO$_2$ being 0.

$$Po'=(Po_i-0.405)/1.023$$

Here, Po$_i$ is the oxygen ion donating ability of each oxide, Namely the ease by which oxygen ions are released, and is the reciprocal of the cation-oxygen inter-attractive force A$_i$. Namely, $$Po_i=1/A_i$$

where, A$_i$ is indicated with the following equation based on coulomb force.

$$A_i=Z_i\times 2/(r_i+1.40)^2$$

(where Z$_i$ is the valence of cation, and r$_i$ is the cation radius (Å)).

Glass is used in the present invention having a basicity within the range of 0.4 to 0.9. Calculation of the basicity of representative ruthenium composite oxides using the same method yields values of 0.406 for $Nd_2Ru_2O_7$, 0.497 for $NdCaRu_2O_7$, 0.587 for $CaRuO_3$ and 0.722 for $SrRuO_3$, with nearly all lying within the range of 0.4 to 0.8. According to studies conducted by the inventors of the present invention, if the basicity of the glass is close to the basicity of a ruthenium composite oxide, the effect of inhibiting the decomposition of the ruthenium composite oxide is large. If the glass basicity is outside the range of 0.4 to 0.9, the decomposition of the ruthenium composite oxide can no longer be inhibited. Furthermore, glass having a basicity in excess of 0.9 has an extremely low stability and low chemical durability, and cannot be used in thick film resistors.

Although examples of $MSi_2Al_2O_8$ crystals include celsian, hexacelsian, paracelsian, etc., these crystals are present in a state of being uniformly dispersed in the glass matrix of a thick film resistor obtained by firing. Due to the presence of these crystals, a uniform and stable electrically conductive particle/glass microstructure can be formed, and electrically conductive particles make close contact within the glass matrix, which is believed to allow the formation of a stable conductive network which was difficult to form with conventional lead-free thick film resistors.

Although $MSi_2Al_2O_8$ crystal powder may, separately from the glass, be added into a resistor composition in order to form such a resistor, an amorphous glass having a composition such that these crystals precipitate during firing is used preferably. Alternatively, partially crystallized glass obtained by preliminarily precipitating $MSi_2Al_2O_8$ crystals by heat-treating an amorphous glass having this type of composition may also be used. In the case of using this crystallizable amorphous glass or partially crystallized glass, fine crystals uniformly precipitate throughout the resistor film by firing, which is believed to stabilize the conductive network.

(Ba,Sr)—Si—Al system glass, containing as essential components thereof at least barium and/or strontium, aluminum and silicon, is used for the glass, enabling precipitation of the $MSi_2Al_2O_8$ crystals. If the amount of precipitating crystals is excessively large, the resistor becomes hard and tends to demonstrate poor laser trimming properties, while the resistance values tend to be excessively high. If the precipitated amount is too low, it becomes difficult to obtain stable characteristics, particularly in the high resistance range. A preferable glass which enables precipitation of a suitable amount of $MSi_2Al_2O_8$ crystals is a (Ba,Sr)—Si—Al system glass having boron and aluminum contents in terms of the respective oxides thereof of 5 to 30 mol % of $B_2O_3$ and 1 to 20 mol % of $Al_2O_3$. This glass may also contain alkaline metal elements and zirconium in terms of the amounts of the respective oxides thereof of 10 mol % or less of $R_2O$ (where R indicates an alkaline metal element) and 20 mol % or less of $ZrO_2$. A $B_2O_3$ content in excess of 30 mol % and an $R_2O$ content in excess of 10 mol % are not preferable since, in the case the resistor composition contains a ruthenium composite oxide as an electrically conductive component, decomposition of the ruthenium composite oxide tends to occur during firing. If the content of the $Al_2O_3$ exceeds 20 mol %, the amount of $MSi_2Al_2O_8$ crystals tends to become excessively large. In addition, if the $ZrO_2$ content exceeds 20 mol %, in addition to the Young's modulus tending to be excessively large, since the $ZrO_2$ itself has a high level of heat resistance, the laser trimming properties tend to worsen.

The glass enabling precipitation of $MSi_2Al_2O_8$ crystals more preferably contains CaO, BaO and SrO at a total content of 20 to 60 mol %, and SiO$_2$ at 20 to 50 mol %. If the total content of CaO, BaO and SrO is less than 20 mol %, the Po value tends to substantially be lower than 0.4, while if the total content exceeds 60 mol %, the coefficient of thermal expansion tends to become excessively large, and the amount of $MSi_2Al_2O_8$ crystals tends to become excessively large. If the $SiO_2$ content is less than 20 mol %, the formation of $MSi_2Al_2O_8$ crystals tends to become inadequate, while if the content exceeds 50 mol %, in addition to the Young's modulus tending to become excessively large, the Po value tends to substantially decreases.

An example of a preferable glass composition is indicated as follows: $SiO_2$: 25 to 35 mol %, $Al_2O_3$: 3 to 15 mol %, BaO and/or SrO: 5 to 50 mol %, $B_2O_3$: 10 to 25 mol %, CaO: 15 to 40 mol %, $ZrO_2$: 0 to 10 mol %, $R_2O$: 0 to 5 mol %.

Moreover, one or more types of metal oxides capable of Adjusting the TCR and other resistor characteristics, such as $Nb_2O_5$, $Ta_2O_5$, $TiO_2$, CuO, $MnO_2$, $La_2O_3$, ZnO, etc., may also be contained as glass components within a range which satisfies the above-mentioned Po value. These components can be more uniformly dispersed in the resistor by being contained in the glass, and although they are able to be highly effective, even if present in small amounts, they are normally contained in the glass at a total content of 1 to 10 mol %, and the content thereof is suitably adjusted corresponding to the target characteristics. In addition to those listed above, components such as $WO_3$, $MoO_3$, $SnO_2$, etc., can be suitably added within a range which does not impair the characteristics of the glass.

The (Ba,Sr)—Si—Al glass precipitating the $MSi_2Al_2O_8$ crystals generally has a high hardness, tending to make laser trimming of the resistor difficult, or tending to cause poor stability following trimming. Although this is rectified by using (Ba,Sr)—Si—Al glass having a low Young's modulus, in the present invention, a glass having a Young's modulus of 50 to 95 GPa is used preferably.

The coefficient of thermal expansion of the glass is important for obtaining superior resistor characteristics, and it is desirable to select a coefficient of thermal expansion of the resistor after firing that is roughly equal to or smaller than the coefficient of thermal expansion of the substrate. For example, in the case of applying to an alumina substrate, glass is preferably used having a coefficient of thermal expansion. of about 65 to $90 \times 10^{-7}$/° C.

Although there are no particular limitations on the softening point of the glass, since the resistor composition of the present invention is fired at a temperature of about 700 to 900° C., a glass having a softening point within the range of 500 to 750° C. is used preferably.

In the resistor composition of the present invention, although the glass component may be blended in the form of a glass powder, a portion or all of the glass component may also be blended in the form of a composite powder with the electrically conductive component as previously described. In the case of using a glass powder not compounded with an electrically conductive component, although the mean particle size of the glass powder may be about 3 µm or less, in order to form a stable resistor having few fluctuations, the average particle size is preferably within the range of 0.01 to 1 µm, and particularly preferably within the range of 0.05 to 0.5 µm.

Furthermore, two or more types of glass having different compositions may also be mixed and used. For example, (Ba,Sr)—Si—Al system glass may be used in combination with a lead-free glass having a different composition. In the case of using a plurality of types of glass, it is necessary that the basicity as calculated from all of the component oxides which compose the glass be within the range of 0.4 to 0.9.

The weight ratio between the electrically conductive component and the glass is preferably within the range of 65:35 to 25:75.

Organic Vehicle

The electrically conductive component and glass are Blended with an organic vehicle, and other inorganic additives As necessary, to obtain a resistor composition in the form of a paste, coating material or ink having a rheology suitable for a method for applying the resistor composition such as screen printing. There are no particular limitations on the organic vehicle. Ordinary known solvents such as terpineol, carbitol, butylcarbitol, cellosolve, butylcellosolve and esters thereof, toluene, xylene, etc., may be used, and, in these solvents, resins such as ethyl cellulose, nitrocellulose, acrylic ester, methacrylic ester, rosin, etc., may be dissolved. Plasticizers, viscosity adjusters, surfactants, oxidizing agents, organometallic compounds and so on may also be added.

The blending ratio of the organic vehicle may be within a range normally used in resistor compositions, and is suitably adjusted corresponding to the method in which the resistor composition is to be applied, such as printing. Preferably, the inorganic solid content is about 50 to 80% by weight, while the organic vehicle content is about 50 to 20% by weight.

Other Additives

Various inorganic additives normally used for the purpose of improving or adjusting the TCR, current noise, ESD characteristics or other resistor characteristics may be added, either alone or in combination to the resistor composition of the present invention over a range which does not impair the effects of the present invention, examples of which include $Nb_2O_5$, $Ta_2O_5$, $TiO_2$, CuO, $MnO_2$, ZnO, $ZrO_2$ and $Al_2O_3$. The blending of such additives allows the production of a resistor having superior characteristics over a wide range of resistance values. Although the amount added is suitably adjusted corresponding to the purpose of use, it is normally about 1 to 10 parts by weight in total to 100 parts by weight of the total weight of the electrically conductive component and glass.

Resistor Production

The resistor composition of the present invention is Applied by printing and so on in a predetermined shape on an alumina substrate, glass ceramic substrate or other insulating substrate, or on a laminated electronic component, using ordinary methods, and after drying, is fired at a high temperature of, for example, 700 to 900° C. A protective coating is normally formed on a resistor formed in this manner by firing on an overcoat glass, and the resistance value is adjusted as necessary by laser trimming and so on.

Although the following provides a more detailed explanation of the present invention through examples thereof, the present invention is not limited to these examples.

EXAMPLE 1

40 parts by weight of $CaRuO_3$ powder having a specific surface area of 20 m²/g and a mean particle size of about 0.06 µm, 60 parts by weight of glass powder A having the composition shown in Table 1, a mean particle size of 0.1 µm and a Po value of 0.468, and 30 parts by weight of an organic vehicle (25% terpineol solution of ethyl cellulose) were mixed and kneaded to produce a paste-like resistor composition. Furthermore, the Young's modulus (calculated), softening point and coefficient of thermal expansion of glass A are as shown in Table 1.

This composition was screen printed in a square pattern measuring 1 mm×1 mm onto an alumina substrate, on which Ag/Pd thick film electrodes had been formed by firing, so as to provide a dried film thickness of about 15 µm and, after drying the printed composition at 150° C., was fired in air at a peak temperature of 850° C. over a total firing time of 40 minutes to produce a resistor.

When the fired film was investigated with a field emission scanning electron microscope (FE-SEM) and an X-ray diffraction analyzer, $BaSi_2Al_2O_8$ crystals (celsian and hexacelsian) were confirmed to have precipitated throughout the resistor film. In addition, the sheet resistance value (for a fired film thickness of 7 μm), TCR measured at +25 to +125° C. and −55 to +25°C., current noise and STOL (short-term overload) of the resulting resistor were investigated, and those results are shown in Table 2. All values are the means for 20 resistor samples. Furthermore, STOL was investigated by measuring the change in resistance after applying a voltage equal to 2.5 times the standard working voltage (¼ W) (maximum voltage: 400 V) for 5 seconds.

EXAMPLE 2

A resistor paste was produced in the same manner as Example 1 with the exception of making the ratios of $CaRuO_3$ and glass as shown in Table 2. A resistor was then produced in the same manner as Example 1 followed by measurement of sheet resistance, TCR, current noise and STOL. Those results are also shown in Table 2.

EXAMPLE 3

A resistor paste was produced in the same manner as Example 1 with the exception of adding 5 parts by weight of $Nb_2O_5$ powder as an additive, based on a total of 100 parts by weight of $CaRuO_3$ and glass. A resistor was produced in the same manner as Example 1 followed by investigation of the characteristics thereof. Those results are also shown in Table 2.

EXAMPLES 4-10

Resistor pastes were produced in the same manner as Example 1 with the exception of using glasses B to H (mean particle size about 0.1 μm) shown in Table 1 for the glass powder, and making the blended amounts of $CaRuO_3$, $RuO_2$, glass and additives as shown in Table 2. Resistors were produced in the same manner as Example 1 followed by investigation of the characteristics thereof. Those results are also shown in Table 2.

EXAMPLE 11

A resistor paste was produced in the same manner as Example 1 with the exception of using 25 parts by weight of $CaRuO_3$ powder having a specific surface area of 20 $m^2/g$ and a mean particle size of about 0.06 μm, 15 parts by weight of $RuO_2$ powder having a specific surface area of 14 $m^2/g$ and a mean particle size of about 0.06 μm, and 60 parts by weight of glass H. A medium resistance range resistor was produced in the same manner as Example 1 followed by investigation of the characteristics thereof. Those results are also shown in Table 2.

EXAMPLE 12

A mixture composed of 40% by weight of $CaRuO_3$ having a specific surface area of 15 $m^2/g$ and 60% by weight of glass powder C having a mean particle size of about 0.1 μm was heat-treated for 1 hour at 600° C. followed by crushing with a ball mill to obtain a composite powder having a specific surface area of 18 $m^2/g$ and a mean particle size of about 0.07 μm. 100 parts by weight of this composite powder was kneaded with 40 parts by weight of an organic vehicle composed of a 25% terpineol solution of ethyl cellulose to produce a paste-like resistor composition.

A resistor was then produced in the same manner as Example 1 followed by measurement of sheet resistance, TCR, current noise and STOL. Those results are also shown in Table 2.

EXAMPLE 13

A composite powder having a specific surface area of 18 $m^2/g$ and a mean particle size of about 0.07 μm was obtained and resistor paste was produced in the same manner as Example 12 with the exception of using 30% by weight of a $CaRuO_3$ powder having a specific surface area of 15 $m^2/g$ and 70% by weight of glass powder D. A resistor was then produced in the same manner as Example 12 followed by investigation of the characteristics thereof. Those results are also shown in Table 2.

Comparative Examples I-VI

Resistor pastes were produced in the same manner as Example 1 with the exception of using glasses I to M (mean particle size out 0.1 μm) shown in Table 1 for the glass powder, and using the blending ratios for $CaRuO_3$, glass and additives shown in Table 2. Resistors were produced in the same manner as Example 1 followed by investigation of the characteristics thereof. Those results are also shown in Table 2.

TABLE 1

| | Glass Composition (mol %) | | | | | | | | | | | | Basicity | Young's modulus | Softening point | Coefficient of thermal expansion |
| | $SiO_2$ | $Al_2O_3$ | BaO | SrO | $B_2O_3$ | CaO | $ZrO_2$ | $Ta_2O_5$ | CuO | ZnO | $WO_3$ | $Li_2O$ | Po | (GPa) | (° C.) | (×$10^{-7}$/° C.) |
|---|---|---|---|---|---|---|---|---|---|---|---|---|---|---|---|---|
| A | 30 | 10 | 10 | — | 16 | 26 | 3 | 2 | 3 | — | — | — | 0.468 | 91 | 721 | 83 |
| B | 30 | 10 | 20 | — | 13 | 20 | 2 | 2 | 3 | — | — | — | 0.561 | 87 | 703 | 84 |
| C | 30 | 15 | 10 | — | 16 | 25 | — | 2 | 2 | — | — | — | 0.455 | 90 | 730 | 88 |
| D | 35 | 5 | 10 | — | 18 | 25 | — | 4 | 3 | — | — | — | 0.444 | 88 | 716 | 69 |
| E | 30 | 10 | 35 | — | 19 | — | — | 3 | 3 | — | — | — | 0.594 | 83 | 648 | 74 |
| F | 25 | 10 | 30 | — | 14 | — | — | — | 2 | 13 | 2 | 4 | 0.668 | 78 | 615 | 78 |
| G | 35 | 10 | — | 10 | 15 | 23 | 2 | 2 | 3 | — | — | — | 0.407 | 88 | 670 | 83 |
| H | 30 | 10 | — | 20 | 18 | 15 | 2 | 2 | 3 | — | — | — | 0.454 | 88 | 657 | 84 |
| I | 30 | 3 | — | — | 25 | 40 | 2 | — | — | — | — | — | 0.416 | 90 | 725 | 78 |
| J | 40 | — | — | — | 25 | 33 | — | 2 | — | — | — | — | 0.337 | 89 | 745 | 58 |

TABLE 1-continued

| | Glass Composition (mol %) | | | | | | | | | | | | Basicity | Young's modulus | Softening point | Co-efficient of thermal expansion |
|---|---|---|---|---|---|---|---|---|---|---|---|---|---|---|---|---|
| | $SiO_2$ | $Al_2O_3$ | BaO | SrO | $B_2O_3$ | CaO | $ZrO_2$ | $Ta_2O_5$ | CuO | ZnO | $WO_3$ | $Li_2O$ | Po | (GPa) | (° C.) | (×10$^{-7}$/° C.) |
| K | 30 | 10 | — | — | 20 | 32 | 3 | 2 | 3 | — | — | — | 0.373 | 92 | 731 | 80 |
| L | 35 | 10 | 3 | — | 17 | 28 | 2 | 2 | 3 | — | — | — | 0.377 | 93 | 740 | 79 |
| M | 32 | — | — | — | 19 | 25 | 4 | 2 | 3 | 15 | — | — | 0.393 | 86 | 722 | 61 |

TABLE 2

| Example | $CaRuO_3$ (part by weight) | $RuO_2$ (part by weight) | Glass Type | Glass (Part by weight) | $Nb_2O_5$ (part by weight) | $MSi_2Al_2O_8$ crystal phase | Sheet resistance (Ω/□) | TCR (ppm/° C.) | Current noise (dB) | STOL (%) |
|---|---|---|---|---|---|---|---|---|---|---|
| 1 | 40 | — | A | 60 | — | $BaSi_2Al_2O_8$ | 32.19 k | Within ±100 | −10 | 0.01 |
| 2 | 30 | — | A | 70 | — | $BaSi_2Al_2O_8$ | 8.891 M | Within ±150 | 12 | −0.01 |
| 3 | 40 | — | A | 60 | 5 | $BaSi_2Al_2O_8$ | 150.7 k | Within ±100 | −3 | −0.01 |
| 4 | 40 | — | B | 60 | 5 | $BaSi_2Al_2O_8$ | 466.0 k | Within ±100 | −5 | −0.02 |
| 5 | 40 | — | C | 60 | 5 | $BaSi_2Al_2O_8$ | 402.3 k | Within ±150 | 3 | −0.01 |
| 6 | 30 | — | D | 70 | — | $BaSi_2Al_2O_8$ | 1.912 M | Within ±150 | 12 | −0.02 |
| 7 | 40 | — | E | 60 | 5 | $BaSi_2Al_2O_8$ | 610.4 k | Within ±150 | 1 | −0.02 |
| 8 | 40 | — | F | 60 | 5 | $BaSi_2Al_2O_8$ (small amount) | 42.41 k | Within ±100 | −11 | 0.01 |
| 9 | 40 | — | G | 60 | 5 | $SrSi_2Al_2O_8$ | 314.3 k | Within ±150 | −2 | −0.02 |
| 10 | 40 | — | H | 60 | — | $SrSi_2Al_2O_8$ | 119.5 k | Within ±100 | −4 | −0.01 |
| 11 | 25 | 15 | H | 60 | — | $SrSi_2Al_2O_8$ | 16.22 k | Within ±100 | −12 | −0.00 |
| 12* | 40* | — | C | 60* | 5 | $BaSi_2Al_2O_8$ | 208.5 k | Within ±100 | −6 | −0.00 |
| 13** | 30** | — | D | 70** | — | $BaSi_2Al_2O_8$ | 1.033 M | Within ±150 | 2 | −0.01 |
| I | 30 | — | I | 70 | — | — | 296.9 k | Within ±400 | ∞ | −0.35 |
| II | 40 | — | J | 60 | 5 | — | 54.15 k | Within ±900 | −5 | −0.06 |
| III | 30 | — | J | 70 | — | — | 32.27 M | Within ±800 | ∞ | −0.14 |
| IV | 40 | — | K | 60 | — | — | 15.99 k | Within ±300 | −5 | −0.32 |
| V | 30 | — | L | 70 | — | $BaSi_2Al_2O_8$ (trace) | 401.5 k | Within ±400 | ∞ | −0.59 |
| VI | 40 | — | M | 60 | 5 | — | 9.429 k | Within ±700 | 10 | −0.25 |

*, **: The composite powders of $CaRuO_3$ and glass were used, respectively.

As is clear from the above results, according to the present invention, a resistor can be obtained having superior TCR, current noise characteristics and load life characteristics (expressed by STOL), over a wide range of resistance values.

What is claimed is:

1. A resistor composition comprising: a lead-free ruthenium-based electrically conductive component, a lead-free glass having a glass basicity Po value of 0.4 to 0.9 and an organic vehicle; wherein the lead-free glass consists of: 5 to 30 mol % of $B_2O_3$, 1 to 20 mol % of $Al_2O_3$, a total content of 20 to 60 mol % of CaO, BaO and SrO, 20 to 50 mol % of $SiO_2$, 20 mol % or less of $ZrO_2$, and 10 mol % or less of $R_2O$, where R is an alkaline metal element, and, optionally, at least one of $Nb_2O_5$, $Ta_2O_5$, $TiO_2$, CuO, $MnO_2$, $La_2O_3$ and ZnO in a total content of 1 to 10 mol % and at least one of $WO_3$, $MoO_3$ and $SnO_2$, and unavoidable impurities and wherein the resistor composition forms dispersed $MSi_2Al_2O_8$ crystals, where M is selected from the group consisting of Ba, Sr and mixtures thereof, in a glass matrix of a thick film resistor obtained by firing the composition.

2. The resistor composition according to claim 1, wherein the glass contains, as essential components, at least one member selected from the group consisting of Ba, Sr and mixtures thereof, aluminum and silicon, and precipitates $MSi_2Al_2O_8$ crystals, where M is selected from the group consisting of Ba, Sr and mixtures thereof, by firing.

3. The resistor composition according to claim 1, wherein the Young's modulus of the glass is from 50 to 95 GPa.

4. The resistor composition according to claim 1, wherein the ruthenium-based electrically conductive component is a ruthenium composite oxide.

5. The resistor composition according to claim 1, wherein the ruthenium-based electrically conductive component and the glass are contained in the form of ruthenium-based electrically conductive powder and glass powder, respectively.

6. The resistor composition according to claim 5, wherein the ruthenium-based electrically conductive powder has a specific surface area of 5 to 30 m$^2$/g.

7. The resistor composition according to claim 1, wherein at least a portion of the ruthenium-based electrically conductive component and the glass are contained in the form of a preliminarily compounded composite powder.

8. The resistor composition according to claim 7, wherein the preliminarily compounded composite powder has a specific surface area of 5 to 30 m$^2$/g.

9. A thick film resistor obtained by firing the resistor composition according to claim 1, the thick film resistor comprising: a lead- and bismuth-free ruthenium-based electrically conductive phase and $MSi_2Al_2O_8$ crystals, where M is selected from the group consisting of Ba, Sr and mixtures thereof, dispersed in a lead- and bismuth-free glass matrix.

10. A resistor composition comprising: a lead-free ruthenium-based electrically conductive component, a lead-free glass having a glass basicity Po value of 0.4 to 0.9 and an organic vehicle; wherein the lead-free glass consists of: 25 to 35 mol % of $SiO_2$, 3 to 15 mol % of $Al_2O_3$, 5 to 50 mol % of at least one selected from the group consisting of BaO and SrO, 10 to 25 mol % of $B_2O_3$, 15 to 40 mol % of CaO, 0 to 10 mol % of $ZrO_2$, and 0 to 5 mol % of $R_2O$, where R is an alkaline metal element, and, optionally, at least one of $Nb_2O_3$, $Ta_2O_5$, $TiO_2$, CuO, $MnO_2$, $La_2O_3$ and ZnO in a total content of 1 to 10 mol % and at least one of $WO_3$, $MoO_3$ and $SnO_2$, and unavoidable impurities and wherein the resistor composition forms dispersed $MSi_2Al_2O_8$ crystals, where M is selected from the group consisting of Ba, Sr and mixtures thereof, in a glass matrix of a thick film resistor obtained by firing the composition.

* * * * *